United States Patent [19]
Buttram et al.

[11] 3,893,286
[45] July 8, 1975

[54] GATHERING AND WINDROWING MACHINE

[75] Inventors: James R. Buttram, Windermere; Melvin H. Woodward, Winter Garden; Charles E. Hubbard, Windermere; Howard K. Thronson, Winter Garden, all of Fla.

[73] Assignee: The Upjohn Company, Kalamazoo, Mich.

[22] Filed: June 28, 1973

[21] Appl. No.: 374,646

[52] U.S. Cl. .................. 56/328 R; 15/82; 15/87; 56/328 TS; 56/377
[51] Int. Cl. .............................................. A01d 51/00
[58] Field of Search ............ 56/328 R, 328 TS, 370, 56/377; 15/82, 87

[56] References Cited
UNITED STATES PATENTS

| | | | |
|---|---|---|---|
| 1,510,880 | 10/1924 | Aitken | 15/87 X |
| 3,105,344 | 10/1963 | Anderson et al. | 56/328 R |
| 3,107,475 | 10/1963 | Gustafson | 56/328 R |
| 3,135,082 | 6/1964 | Czajkowski | 56/377 X |
| 3,377,788 | 4/1968 | Pickrell | 56/377 |
| 3,527,040 | 9/1970 | Teagle | 56/370 |
| 3,543,486 | 12/1970 | Bull | 56/328 TS X |
| 3,579,972 | 5/1971 | Sears | 56/370 |
| 3,626,677 | 12/1971 | Sides | 56/328 R |
| 3,762,140 | 4/1972 | Block | 56/328 R |

FOREIGN PATENTS OR APPLICATIONS

| 1,123,731 | 8/1968 | United Kingdom | 56/370 |
|---|---|---|---|

Primary Examiner—Robert Peshock
Assistant Examiner—J. N. Eskovitz
Attorney, Agent, or Firm—Woodhams, Blanchard and Flynn

[57] ABSTRACT

A machine for gathering and windrowing fruit, such as oranges, lying on the ground. The machine includes a carrier having a plurality of rotating brushes thereon which are positioned directly adjacent the ground. Each brush has a support member which engages the ground for permitting the brushes to follow the ground contour. The brushes, which may be disposed on opposite sides of the carrier, cause the fruit on the ground to be swept inwardly into a row to facilitate picking up of the fruit.

20 Claims, 14 Drawing Figures

PATENTED JUL 8 1975

SHEET 3

PATENTED JUL 8 1975　　　　3,893,286

SHEET 4

GATHERING AND WINDROWING MACHINE

FIELD OF THE INVENTION

This invention relates to an apparatus designed to facilitate the harvesting of fruit and, more specifically, to a machine for gathering and windrowing fruit, such as oranges, which are lying on the ground.

BACKGROUND OF THE INVENTION

The harvesting of fruit, particularly citrus fruits such as oranges and the like, has been historically and conventionally performed primarily manually by pickers, but machinery has been adapted for this purpose. Nevertheless, harvesting of the fruit is still slow and inefficient. The cost of handpicking has substantially increased in recent years, and the problems associated with the handpicking of fruit have been further complicated by a shrinking labor supply. Thus, continuing to harvest large quantities of fruit by hand has become increasingly expensive and unreliable.

To overcome the problems associated with handpicking, a variety of mechanical systems have been devised in an attempt to permit efficient harvesting of the fruit. For example, trunk shakers, limb shakers, foliage shakers, air blast shakers, and water cannons have been used for removing the fruit from the limbs of the trees. Attempts have also been made to use catcher frames for collecting the falling fruit, and elaborate pickup devices have been devised to assist collecting the fruit from the ground.

The mechanical harvesting of fruit has been facilitated by the development of abscission agents which are sprayed on the trees to loosen the stems of the fruit so that the fruit can be readily disengaged from the tree by means of shakers or the like.

While the use of abscission agents coupled with shakers has proven effective for mechanically removing the fruit from the tree, nevertheless the problem of collecting the fruit after it has dropped on the ground has continued to present a serious problem. Attempts to utilize catcher frames have not proven highly successful or desirable since the catcher frames are extremely bulky and cumbersome, and they are thus difficult to manipulate through the groves. Further, in many groves the trees are not properly positioned so as to permit efficient use of catcher frames. Moreover, many citrus trees, specifically orange trees, have branches extremely close to the ground and in a high percentage of orange groves the clearance between the tree and the ground is no more than approximately twelve inches. Thus, it is extremely difficult to arrange fruit catching frames under the trees in a high percentage of groves.

While several types of pickup devices have been devised for permitting the fruit to be picked off the ground, nevertheless all of these known devices have met with only limited success due to their limited applicability. More specifically, most of the known devices have been able to pick up only the fruit which is deposited in the open spaces between the adjacent rows of trees. Due to the small clearance which exists under the trees, these known devices are not able to collect the fruit which falls under the trees, or between closely adjacent trees. These known devices thus miss a substantial amount of the fruit which lies on the ground, and this large quantity of missed fruit must then be manually collected.

Also, existing machines for collecting the fruit on the ground often damage excess amounts of fruit during the collecting operation.

Accordingly, it is an object of the present invention to provide an improved apparatus which is able to efficiently gather and collect the fruit, such as oranges, after it has been deposited on the ground, which apparatus is able to gather the fruit from beneath and between the trees to thus enable mechanical gathering of a very high percentage (as from 94 to 100 percent) of the fruit lying on the ground. More specifically, it is an object of the present invention to provide:

1. An apparatus, as aforesaid, which is capable of mechanically gathering fruit from beneath and around trees and causing the fruit to be collected in a windrow which extends along and between two rows of trees.

2. An apparatus, as aforesaid, which utilizes a plurality of rotating brushes which effectively sweep the fruit on the ground into a windrow without damaging the fruit.

3. An apparatus, as aforesaid, which utilizes a plurality of rotating brushes mounted on a carrier, such as a self-propelled vehicle, with at least some of the brushes being mounted on elongated arms which can extend under the trees to remove the fruit therefrom.

4. An apparatus, as aforesaid, in which each brush includes a suitable flotation structure for enabling the brushes to move along the surface of the ground in accordance with the contour thereof, with a minimum of resistance and without causing the brushes to plow into the ground.

5. An apparatus, as aforesaid, provided with opposed sets of brushes on both sides of the carrier, which opposed sets rotate in opposite directions so that the carrier can be moved between adjacent rows of trees with the opposed sets of brushes gathering the fruit from under the two adjacent rows of trees into a windrow located between the two rows of trees to facilitate mechanical pickup of the fruit.

6. An apparatus, as aforesaid, which includes suitable pickup structure for enabling the fruit within the windrow to be automatically picked up and deposited into boxes or the like connected to the carrier.

7. An apparatus, as aforesaid, which permits a very high percentage of the fruit deposited on the ground to be quickly gathered and collected within a windrow.

8. An apparatus, as aforesaid, which enables the rotating brushes to be moved under the branches of the tree, even when the clearance under the trees is as small as 12 inches, to permit the efficient removal of fruit from beneath the tree without damaging the tree or the fruit.

9. An apparatus, as aforesaid, which can also be used for removing soil, debris and/or undergrowth from beneath the trees by providing the rotating brushes with bristles which are sufficiently stiff to cut through and/or move such materials.

10. An apparatus, as aforesaid, which can also be used for applying a herbicide to the vines and weeds which grow under the trees for controlling the growth thereof, which herbicide is applied to the rotating brushes, which brushes in turn apply the herbicide to the vines and weeds under the trees. Other objects and purposes of the present invention will be apparent to persons acquainted with fruit harvesting operations, particularly mechanical fruit harvesting operations, upon reading the following specification and inspecting the accompanying drawings.

Certain terminology will be used in the following description for convenience in reference, only. The words "upwardly," "downwardly," "leftwardly," and "rightwardly" will refer to directions in the drawings to which reference is made. The word "forwardly" will refer to the normal direction of travel of the apparatus as it moves through a fruit grove or orchard, which direction is leftwardly in FIGS. 1–3 and 6–8. The words "inwardly" and "outwardly" will refer to directions toward and away from, respectively, the geometric center of the apparatus and designated parts thereof. Said terminology will include the words above specifically mentioned, derivatives thereof and words of similar import.

SUMMARY OF THE INVENTION

The objects and purposes of the present invention are met by providing a carrier with a plurality of large diameter brushes thereon, which brushes are positioned adjacent to the ground and are rotatably supported by the carrier so as to follow the contour of the ground as the carrier moves therealong. The brushes are rotated about substantially vertical axes for sweeping the fruit lying on the ground into a windrow to facilitate subsequent collection or pickup thereof. In a preferred embodiment of the invention, the carrier is provided with a plurality of rotating brushes disposed in two rows extending outwardly from the opposite sides of the carrier and supported thereon by means of elongated arms which project from the carrier to enable the brushes to be moved beneath the branches of the trees to gather the fruit which is deposited on the ground thereunder. The brushes in each row all rotate in the same direction for causing the fruit to be swept out from beneath the trees and moved into a windrow. The carrier is also preferably provided with similar rotating brushes disposed in front of the front wheels of the carrier. The carrier may be provided with one row of brushes on only one side thereof. Where two rows of brushes are used, they rotate in opposite directions so that the carrier may move between two adjacent rows of trees to permit gathering of fruit from beneath the adjacent rows of the trees and collecting of the fruit into a windrow located between the two rows of trees.

DETAILED DESCRIPTION

FIGS. 1–5 illustrate therein one embodiment of a gathering apparatus 10 according to the invention. The apparatus 10, which is particularly desirable for collecting citrus fruit lying on the ground, includes a self-propelled carrier or vehicle 11 having a pair of brush systems 12 and 13 mounted on the opposite sides thereof. The brush systems 12 and 13 are designed for sweeping the ground to cause the fruit on the ground to be moved into a windrow to facilitate the picking up of same.

Figure 1:
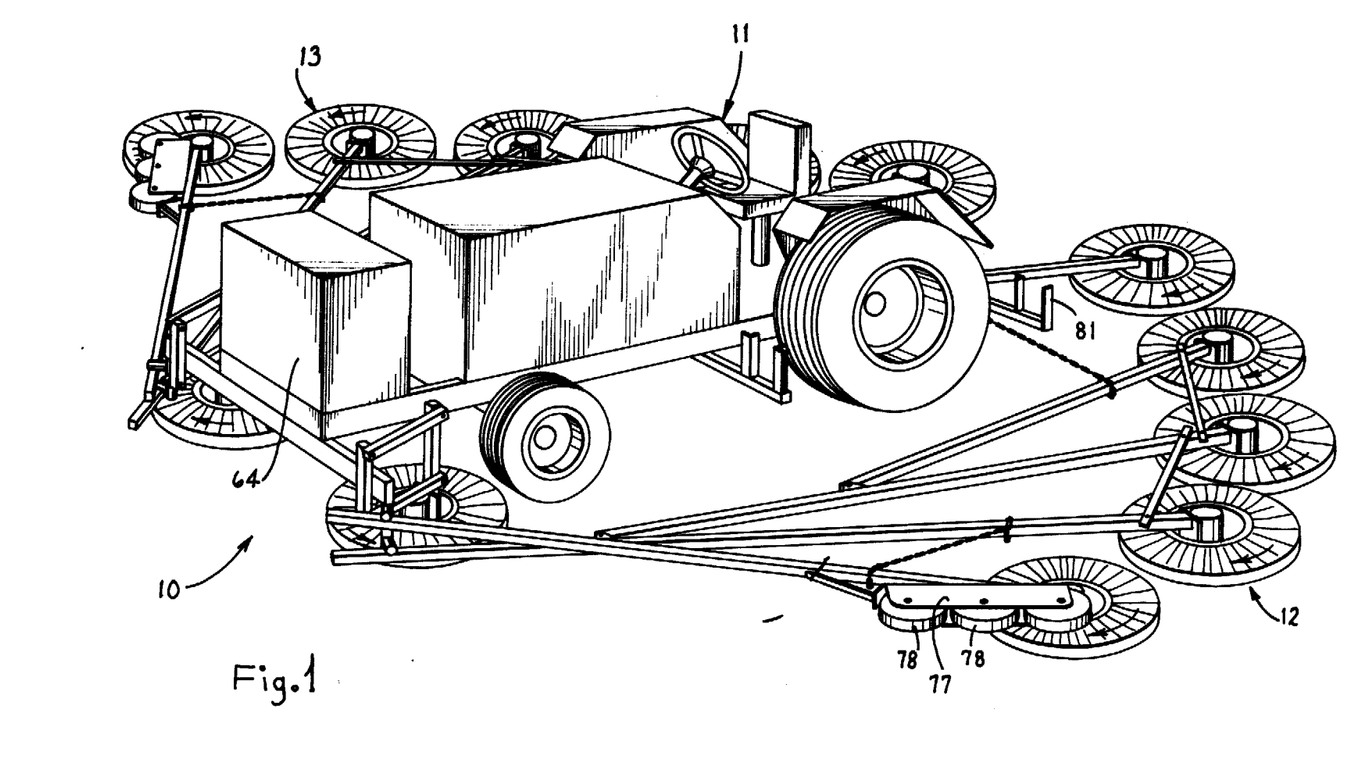
FIG. 1 is a perspective view of an apparatus constructed according to the present invention for gathering fruit as deposited on the ground into a windrow.
Figure 2:
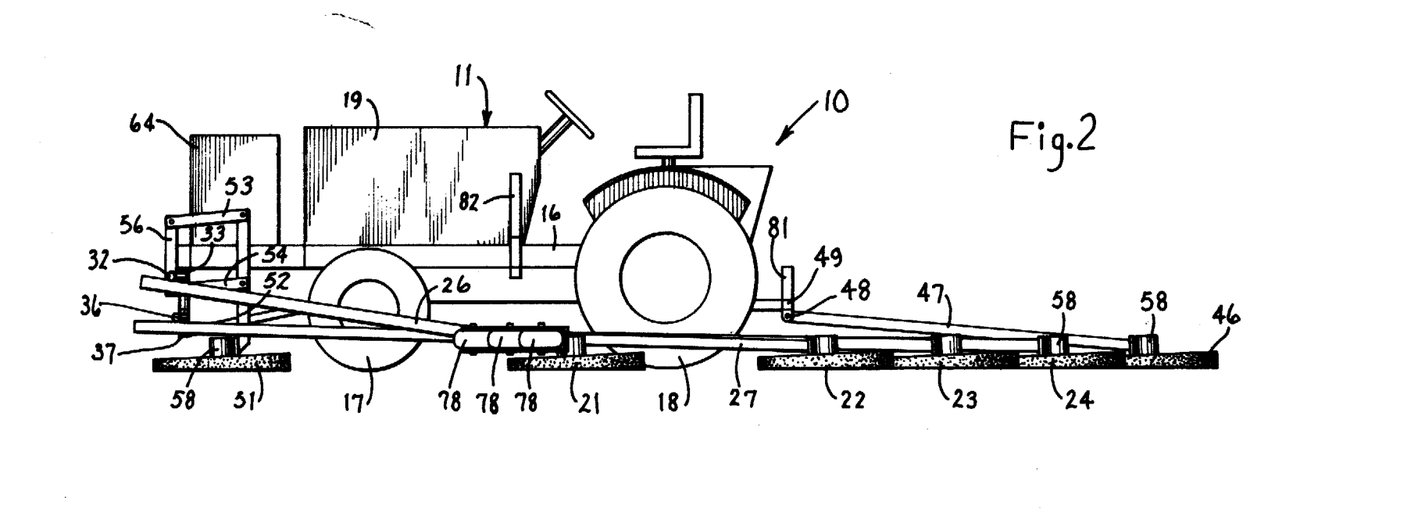
FIG. 2 is a side elevation view of the apparatus illustrated in FIG. 1.
Figure 3:
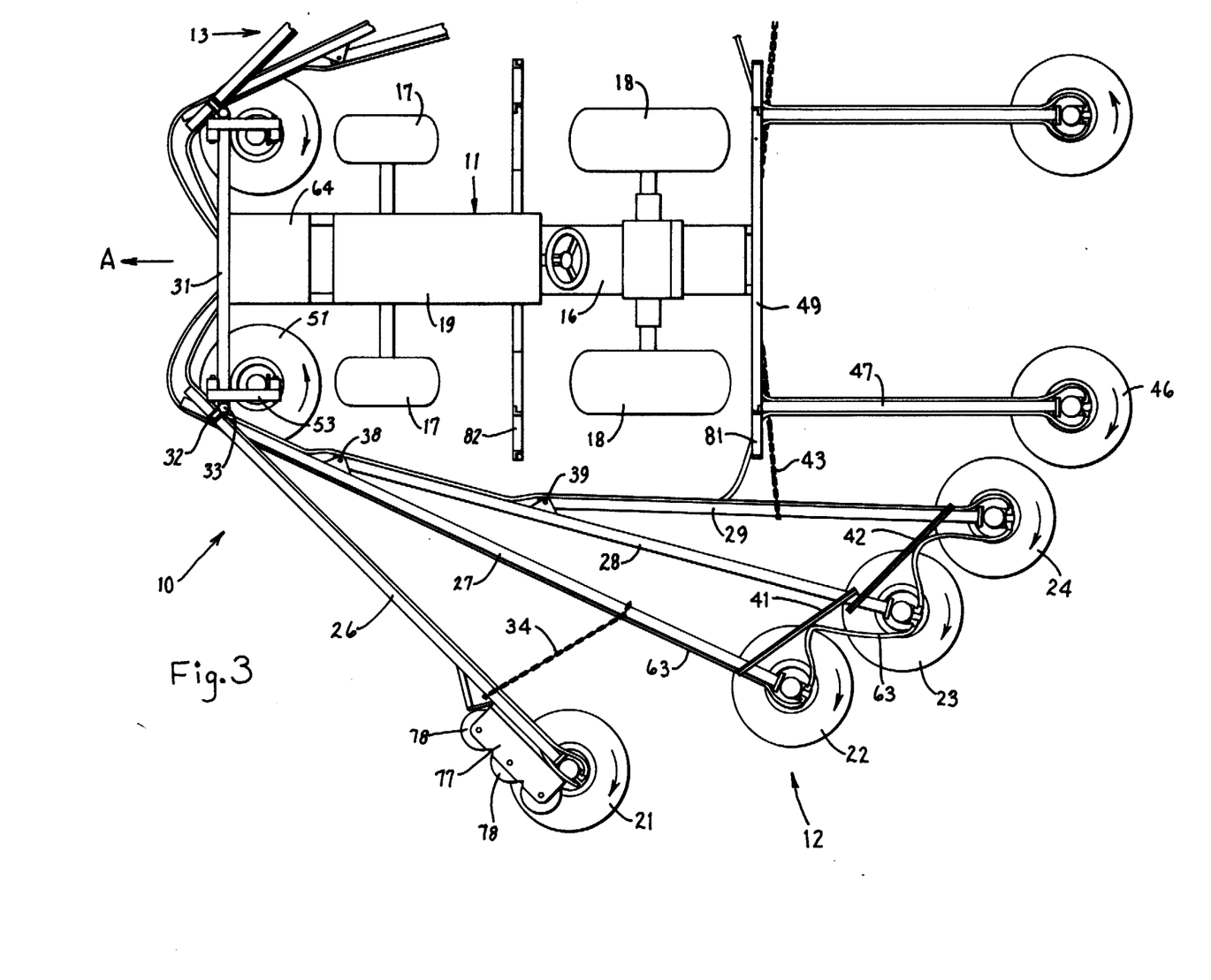
FIG. 3 is a fragmentary top view of the apparatus illustrated in FIG. 1.

In this embodiment, the carrier 11 comprises a conventional self-propelled tractor having a frame 16, a pair of steerable front wheels 17, a pair of driven rear wheels 18 and a conventional combustion engine 19.

With respect to the opposed brush systems 12 and 13, these systems are identical except for being mirror images of one another. Thus, only the brush system 12 will be explained in detail.

The brush system 12 in the embodiment of FIGS. 1–5 includes a plurality of side brush assemblies 21, 22, 23 and 24, which side brush assemblies are supported adjacent the free ends of a plurality of elongated support arms 26, 27, 28 and 29, respectively. The arm 26 associated with the outermost side brush assembly 21 is pivotally supported adjacent its forward end by a horizontal hinge pin 32, which hinge pin in turn is supported by substantially vertical hinge pin 33, the latter being supported upon a front brace member 31 which is fixed to the frame 16 of the vehicle 11 and extends across the front end thereof. The arm 27 associated with the brush assembly 22 is similarly supported adjacent its forward end by a horizontal hinge pin 36, which in turn is supported on a vertical hinge pin 37, the latter being supported on the front brace 31. This hinge structure thus enables each arm 26 and 27 to be pivoted relative to the frame of the vehicle about both vertical and horizontal axes. The arms 26 and 27 are also interconnected by a flexible connecting element 34, such as a chain, which chain limits the maximum angular separation between the arms while enabling the arm 26 to be moved inwardly towards the arm 27 for a purpose to be explained hereinafter.

The remaining arms 28 and 29 are hingedly supported on the arm 27 by means of hinges 38 and 39, respectively. However, the arms 27 28 and 29 are suitably fixed in spaced relationship to one another by intermediate braces 41 and 42. The innermost arm 29 is in turn connected to the frame of the vehicle by an intermediate flexible connecting element 43, such as a chain.

The brush system 12 also includes a rear brush assembly 46 which is supported adjacent the rearward end of an elongated arm 47. The arm 47 at its forward end is hinged at 48 to a rear brace 49 which is fixed to the frame of the vehicle and extends transversely thereacross.

The brush system 12 further includes a front brush assembly 51 positioned directly ahead of and substantially aligned with the front wheel 17. The front brush assembly 51 is mounted on the lower end of an arm 52, which arm 52 in turn is pivotally connected to a pair of parallel levers 53 and 54. The levers 53 and 54 are pivotally supported on a rigid support member 56 which is fixedly secured to the front brace member 31. The support 56, the levers 53 and 54, and the arm 52 function as a parallelogram linkage which permits vertical movement of the brush in the front brush assembly 51 relative to the carrier 11.

Figure 4:
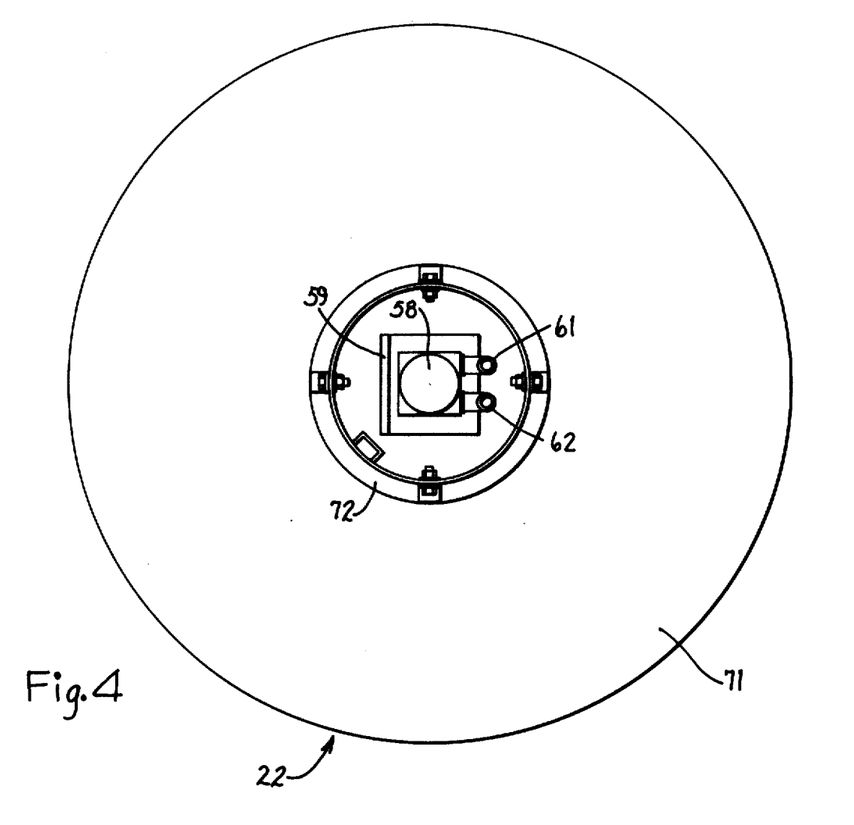
FIG. 4 is a top view of a brush construction incorporated into the apparatus of the present invention.
Figure 5:
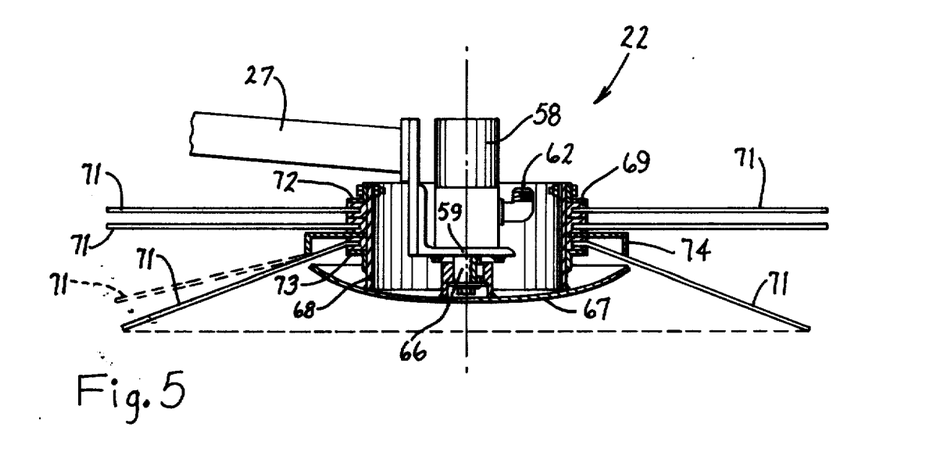
FIG. 5 is a sectional elevational view of the brush structure illustrated in FIG. 4.

The brush assemblies 21, 22, 23, 24, 26 and 51 are substantially identical. Thus, only the brush assembly 22, as illustrated in FIGS. 4 and 5, will be described in detail.

The brush assembly 22 includes a drive motor, such as a fluid-pressure motor 58, mounted on a bracket 59 secured to the end of arm 27. Motor 58 has fittings 61 and 62 associated therewith and connected to conduits 63 for permitting flow of pressure fluid to and from the motor 58. The conduits 63 in turn are connected to a fluid power unit 64 which is mounted on the forward end of the vehicle 11, which power unit 64 is driven by the vehicle engine and includes a conventional fluid pressure pump, a fluid reservoir, and associated control valves and the like. The motors 58 preferably comprise hydraulic motors, although it will be appreciated that other types of drive motors could be utilized if desired.

The motor 58 has a rotatable shaft 66 projecting from one end thereof, which shaft is nonrotatably connected to a support foot or pedestal 67. The pedestal 67, is illustrated in FIG. 5, has a dish shaped configuration resulting in a lower convex surface which is adapted to be positioned in engagement with a support surface, specifically the ground. The support foot 67 has a brush holding sleeve 68 fixed thereto and projecting upwardly therefrom, which sleeve 68 in turn has a plurality of axially adjacent bristle holding rings 69 fixedly mounted thereon in surrounding relationship thereto. Each bristle holding ring 69 has a plurality of bristles 71 mounted thereon, which bristles are mounted closely adjacent one another so as to completely surround the ring. The individual bristles 71 are substantially straight elongated members which project radially outwardly relative to the rotational axis defined by shaft 66. The bristles 71 are preferably constructed from a relatively stiff but flexible material, such as plastic.

In the illustrated embodiment, the brush construction includes three adjacent bristles supporting rings 69 which thus results in three circumstantially extending layers of bristles 71. This structure results in the brush having a rather thick bristle density to enable the desired sweeping function to be performed. The plurality of bristle holding rings 69 are clampingly held in position between a pair of support rings 72 and 73. A ring-like deflector 74 is clampingly held between the two lowermost rings 69, which deflector 74 has an annular flange which projects downwardly so as to engage the lowermost layer of bristles 71, thereby causing the bristles 71 to be projected downward as illustrated in FIG. 5 to an elevation below the lowermost point of the support foot 67. However, when the support foot 67 is disclosed in engagement with the ground, then the free ends of the bristles 71 deflect upwardly substantially as illustrated by dotted lines in FIG. 5. However, due to the provision of the deflector 74, the bristles 71 normally tend to move downwardly into the solid line position illustrated in FIG. 5, whereby the bristles will closely follow the variable ground contour to result in sweeping of the fruit which is located on the ground, even when the ground contains small depressions and the like.

The arm 26 is also provided with a substantially U-shaped bracket 77 (FIG. 3) fixed thereto adjacent to free end thereof. Bracket 77 supports a plurality of rollers 78, which rollers are preferably constructed of rubber or similar material so as to function as bumpers to enable the arm 26 to rollingly engage and move past the trunk of a tree.

The vehicle 11 is also provided with a pair of substantially U-shaped brackets 81 and 82 fixed to the frame 16 thereof. The brackets 81 and 82 are provided so as to receive therein the arms 26, 27, 28 and 29 when these arms are folded inwardly toward the vehicle into a storage position.

As illustrated in FIG. 3, the brush assemblies 21, 22, 23, 24 and 46 are disclosed substantially within a row, which row when viewed from the rear brush assembly 46 projects in the forward direction of the vehicle (which forward direction is designated by the arrow A in FIG. 3) but is inclined outwardly at an acute angle relative to said forward direction. Further, each of said latter-mentioned brushes is positioned so that it is positioned slightly ahead of the next innermost brush assembly, with each adjacent pair of brush assemblies being disposed so that the respective paths of contact of the brush assemblies with the ground overlap one another.

The brush assemblies 21, 22, 23, 24 and 46 all rotate in the same direction (clockwise in FIG. 3), the direction of rotation being selected so that the fruit which is lying on the ground is moved inwardly by the brushes toward the vehicle, whereby the fruit collects within a row behind the vehicle as the vehicle travels in the direction A. Further, due to this direction of rotation, the contact of the brushes with the ground tends to cause the individual brushes to walk or move forward on the ground, thereby maintaining the chains 34 and 43 in a relatively taut condition.

With respect to the brush assembly 51, this brush assembly preferably rotates in the opposite direction (counterclockwise in FIG. 3) to laterally displace the fruit which lies on the path of travel of the wheels 17 and 18, which fruit is kicked outwardly away from the vehicle and is then subsequently engaged by the side brush assemblies.

With respect to the brush system 13, same is identical to the brush system 12 except that the individual brush assemblies associated with the system 13 rotate in the opposite direction to the corresponding brush assemblies associated with the system 12.

Figure 6:
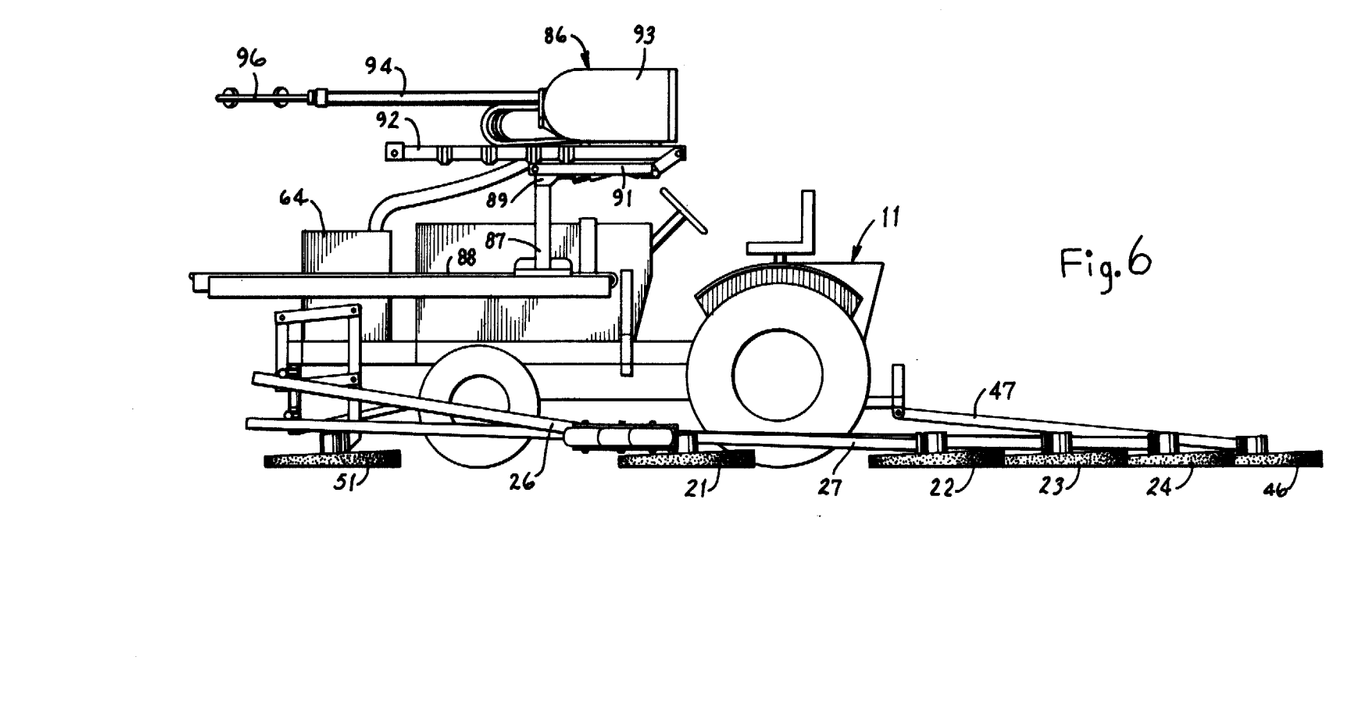
FIG. 6 is a view similar to FIG. 2 but wherein the apparatus also includes a shaker mechanism associated therewith.

FIG. 6 illustrates a modification of the present invention which is identical to the gathering apparatus illustrated in FIG. 1–5, except that the apparatus illustrated in FIG. 6 is additionally provided with a limb-type shaker 86 mounted on the vehicle 11. The shaker 86 is of substantially conventional construction and includes a yoke-like pedestal 87 which is moveable along a track 88 mounted on the vehicle. The pedestal supports a pivot structure 89 on the upper end thereof, on which is pivotally supported a first support beam 91, which in turn is pivoted to a second support beam 92. The support beams 91 and 92 are each vertically swingable by individual powered cylinders (not shown) to permit the shaker mechanism to be vertically elevated as desired. The shaker assembly further includes a shaker mechanism 93 mounted on the upper support beam 92 and provided with a boom 94 projecting therefrom, which boom on the end thereof supports a relatively moveable jaw structure 96 for permitting engagement with the limb of a tree.

In some instances, clusters of fruit remain on some of the trees after the initial removal operation is carried out. Thus, the availability of the shaker 86 is advantageous to complete the dropping and collecting operations.

OPERATION

The operation of the gathering apparatus of the present invention, as illustrated in FIGS. 1 through 5, will be briefly described.

To initiate operation of the gathering apparatus 10, the respective support arms are released from their respective vehicle mounting brackets to enable the arms to be vertically swung downwardly so that the individual brush assemblies 21–24, 46 and 51 rest on the ground due to their own weight, each individual brush assembly being supported by the convex support foot 67. By shifting a suitable control valve (not shown), hydraulic fluid is then supplied to the motors 58 associated with the plurality of brush assemblies to cause rotation of the brush assemblies in the manner illustrated by arrows in FIGS. 1 and 3. The rotation of the individual brush assemblies also results in rotation of the convex support foot 67, thus resulting in a floating type of support for each brush assmebly to facilitate the free movement of the brush assembly along the ground while maintaining the rotating bristles directly adjacent the ground. The rotation of the individual brush assemblies also causes the brush assemblies to tend to walk forwardly relative to the vehicle 11, thus maintaining the chains 34 and 43 in a taut condition. The brush assemblies thus adopt the desired spread position illustrated in FIGS. 1 and 3. The gathering apparatus is now in condition for use.

The gathering apparatus 10 is then driven between two adjacent and substantially parallel rows of trees, such as orange trees, whereupon the brush systems 12 and 13 cause the oranges lying on the ground to be swept into a windrow directly behind the vehicle 11 as same travels along in substantially parallel relationship to the tree row. The side brush assemblies 21, 22, 23 and 24 are designed to extend under the low branches of the tree to permit removal of the fruit which is lying on the ground beneath the branches. Due to the direction of rotation of these brushes, the fruit which is contacted by the outermost brush assembly 21 is moved inwardly towards the vehicle, whereupon the fruit is then successively contacted by the brushes 22, 23, 24 and 46 and is thus effectively collected within a windrow location directly behind the traveling vehicle 11.

Since the brushes are positioned so that each outer brush is positioned ahead of the adjacent inner brush, and since the paths of travel of each adjacent pair of brushes overlap, this thus results in all of the fruit being effectively contacted by one or more of the rotating brush assemblies and swept inwardly into the windrow. With respect to any fruit which may be lying in the path of travel of the vehicle wheels 17 and 18, this fruit is displaced outwardly by the rotating brush assemblies 51, which fruit is then subsequently contacted by the trailing brush assemblies 21, 22, 23, 24 and 46 so as to be displaced inwardly into the windrow.

To facilitate removal of the maximum amount of fruit from under the trees, the brush systems are designed so that the outermost brush assembly 21 extends slightly beyond a line defined by the trunks of the row of trees. Each brush system 12 and 13 thus effectively covers at least half, and preferably slightly more than half, of the area under each respective row of trees. Accordingly, the brush 21 projects between two adjacent trees to permit effective sweeping of the ground but, when a tree trunk is encountered, the rubber bumpers or rollers 78 engage the trunk and cause the arm 26 and brush assembly 21 to be swung inwardly toward the vehicle to facilitate movement of the brush assembly around the trunk without causing damage thereto. After passing the trunk, the rotating brush assembly 21 again automatically moves outwardly away from the vehicle to permit effective sweeping of the area under the trees.

As the gathering apparatus 10 moves along in parallel relationship to the adjacent rows of trees, the fact that each rotating brush assembly is supported from the vehicle frame by means of an arm or linkage which is pivoted for vertical movement results in each brush assembly closely following the ground contour so that the rotating brush bristles are always disclosed closely adjacent to the ground to permit effective contact with the fruit. Further, since the rotating convex support 67 forms a relatively flat but smooth and continuous support surface, this greatly facilitates the movement of each rotating brush assembly along the ground in close conformity to the contour thereof. The convex support 67 also minimizes drag or friction, and prevents the individual brush assemblies from furrowing or plowing into the ground.

Since the rotational axis of each brush assembly is preferably tilted or canted in a slight forward direction with respect to the vertical, this causes the bristles on the front side of each rotating brush assembly to be urged into engagement with the ground. This results in the bristles easily adapting to the various irregularities in the ground to thus facilitate the removal of fruit which may have been deposited into depressions in the ground.

To permit successful collection of the fruit into the windrow, the brush assemblies are of rather large diameter and are preferably rotated at a speed so as to result in the brushes having a tip or peripheral velocity of between 16 and 32 feet per second. A tip velocity of approximately 24 feet per second has proven to be very desirable for use with brushes having a diameter of approximately 3 feet.

The apparatus 10 utilizing rotating brush assemblies thereon can also be used for other purposes. For example, most fruit groves are plowed in the open areas to minimize growth of weeds, vines and the like. However, the areas directly beneath the trees can not be plowed due to the low brances, and thus this results in a bank or pedestal of earth being disposed in surrounding relationship to the trunk of the tree. By using the rotating brush structure of the present invention, which brush structure may require the use of a stiff bristle, the pedestals of earth can be effectively cut down and removed.

Since the control of weeds and vines under low hanging fruit trees is also extremely difficult, it is conventional past practice to spray the weeds and vines under the trees for controlling same. However, most of the more effective sprays, particularly herbicides, are now prohibited from being used in a spray form. Thus, the growth of weeds and vines under fruit trees has again created a substantial problem, particularly since the vines get rather large and grow upwardly into the tree and thus cause damage to same. The rotating brush structure of the present invention is believed to present a very desirable solution to this problem, since the rotating brush structure of the present invention can be used in two different ways to solve this problem. First, the rotating brush structure itself, by the selection of bristles having the desired stiffness, can be used for cutting the weeds and vines which grow under the low hanging branches. Second, a suitable herbicide can be applied to the bristles of the rotating brushes, which brushes can be rotated at a relatively slow speed so as to not cause the herbicide to be thrown therefrom. The brushes with the herbicide thereon can be slowly rotated and moved into contact with the weeds and vines growing under the trees, thereby causing the herbicide to be applied to the weeds so as to kill same. Further, if desired, oils or waxes can be added to the herbicide as applied to the brushes to prevent the migration of the herbicide into undesired areas. In this way, herbicides which can no longer be sprayed can still be effectively utilized since the herbicides will be applied directly to the weeds by means of contact with the brushes. The herbicide can be applied manually to the brush assemblies, or alternately a suitable conduit and nozzle assembly can extend from the vehicle to the brush so as to enable the application of the herbicide onto the rotating brush assembly.

MODIFICATIONS

Figure 7:
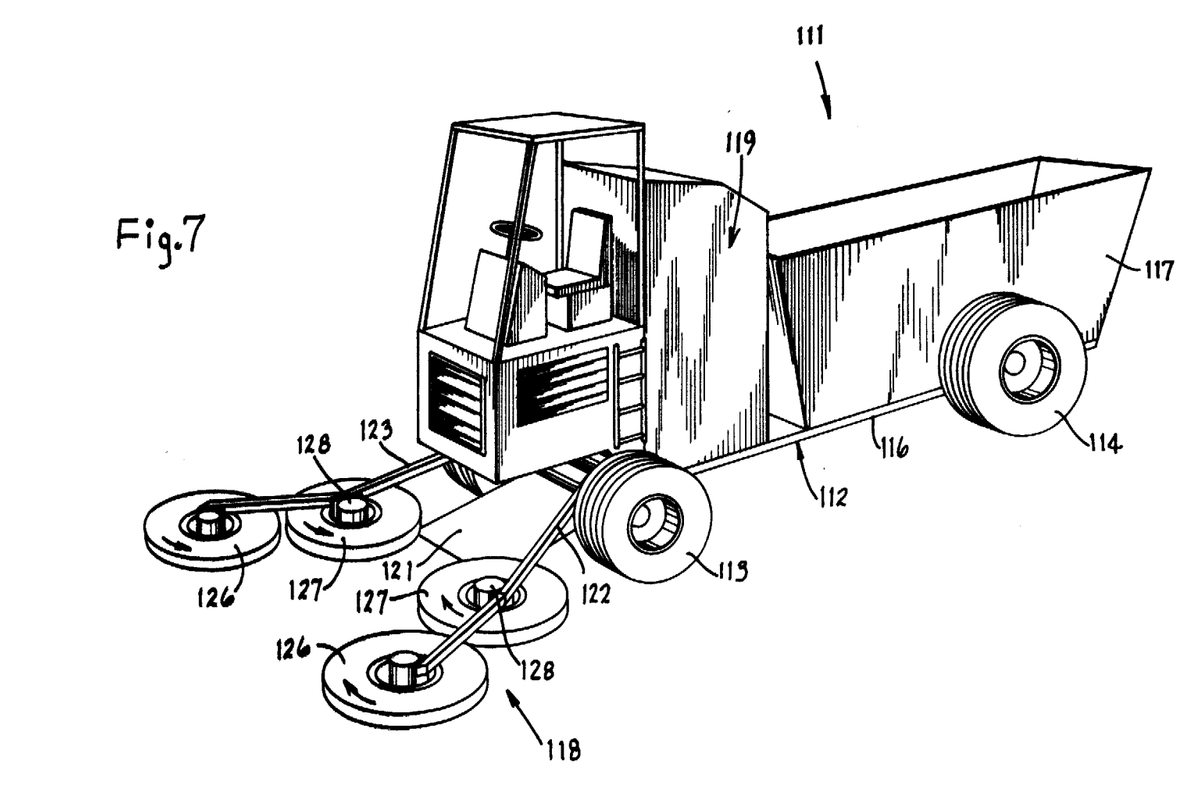
FIG. 7 is a perspective view of a modified apparatus according to the present invention having means for both gathering the fruit into a windrow and for picking up the fruit and depositing same into a container.
Figure 8:
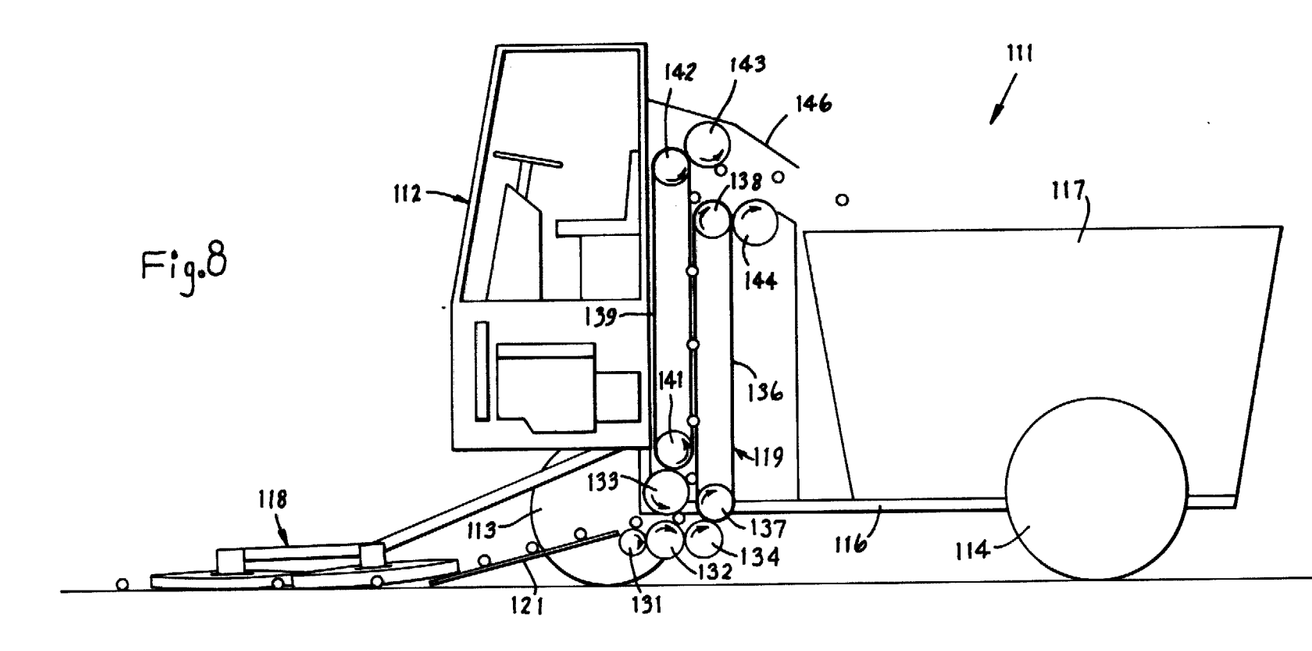
FIG. 8 is an elevational view, partially in cross section, and illustrating therein the pickup structure associated with the apparatus of FIG. 7.

FIGS. 7 and 8 illustrate an apparatus 111 for picking up fruit which has been collected on the ground, which apparatus includes a brush or sweeping system of the type employed on the apparatus illustrated in FIGS. 1 through 5.

The apparatus 111 specifically includes a self-propelled vehicle 112 having front steerable drive wheels 113 and rear wheels 114 rotatably supported on a frame 116. The frame 116 is adapted to have a removable box or container 117 positioned thereon for collecting the fruit therein. A brush system 118 is mounted on the front end of the vehicle and feeds the fruit to a conveyor system 119 which causes the fruit to be deposited into the container 117.

To transfer the fruit from the brush system 118 to the conveyor 119, the vehicle 112 is provided with a pickup plate 121 mounted thereon, which pickup plate 121 is mounted adjacent the front axle of the vehicle and projects forwardly and downwardly therefrom in the manner of a scoop. The front edge of the pickup plate 121 is positioned adjacent the ground, and for this purpose may be provided with slidable guides or the like thereon.

The brush system 118 is disposed adjacent the front edge of the pickup plate 121 for causing the fruit lying on the ground to be pushed up the pickup plate 121 so as to be fed into the conveyor 119. For this purpose, the brush system 118 includes a pair of opposed arms 122 and 123 which project forwardly of the vehicle. Each arm has a pair of rotating brush assemblies 126 and 127 thereon, which assemblies each have a motor 128 associated therewith for causing rotation of the respective brushes. The brush assemblies 126 and 127, which are constructed similar to the brush structure illustrated in FIGS. 4 and 5, are positioned with the outer brush assemblies 126 positioned ahead of and slightly overlapping the inner brush assemblies 127. Thus, the brush assemblies, when rotating as indicated by the arrows in FIG. 7, cause the fruit on the ground to be thrown inwardly so as to be fed through the space defined between the inner brush assemblies 127, whereupon the brushes throw the fruit upwardly along the pickup plate 121 so as to feed same into the lower or inlet end of the conveyor 119.

The conveyor system 119, as illustrated in FIG. 8, includes an elongated rotating roller 131 positioned adjacent the rearward edge of the plate 121 for causing the fruit to be thrown rearwardly between a further pair of counter-rotating rollers 132 and 133. These latter-mentioned rollers discharged the fruit against a further roller 134 which causes the fruit to be thrown upwardly into the space defined between a roller 133 and the upwardly directed reach of a conveyer belt 136. The conveyor belt 136, which is movably supported on pulleys or rollers 137 and 138, has the upwardly directed reach thereof positioned closely adjacent but slightly spaced from the upwardly moving reach of a further conveyer belt 139, the latter supported on further rollers 141 and 142. The fruit is moved upwardly between the upwardly moving reaches of the belts 136 and 139 and is discharged from between the belts at the upper end thereof in the vicinity of a further rotating guide roller 143. The roller 143 rotates in a direction so as to move the fruit rearwardly toward the container 117. A further bottom guide roller 144 is also provided to assist in moving the fruit into the interior of the container 117. A deflector or cover 146 is also secured to the vehicle above the roller 143 for assisting in guiding the fruit into the container 117.

The apparatus 111 of FIGS. 7 and 8, as described above, thus functions primarily as a device for picking up fruit from the ground and then depositing same into a suitable container. The brush system as mounted on the front of the vehicle is provided primarily for assisting in picking the fruit off the ground and for removing the fruit from in front of the vehicle wheels.

Figure 9:
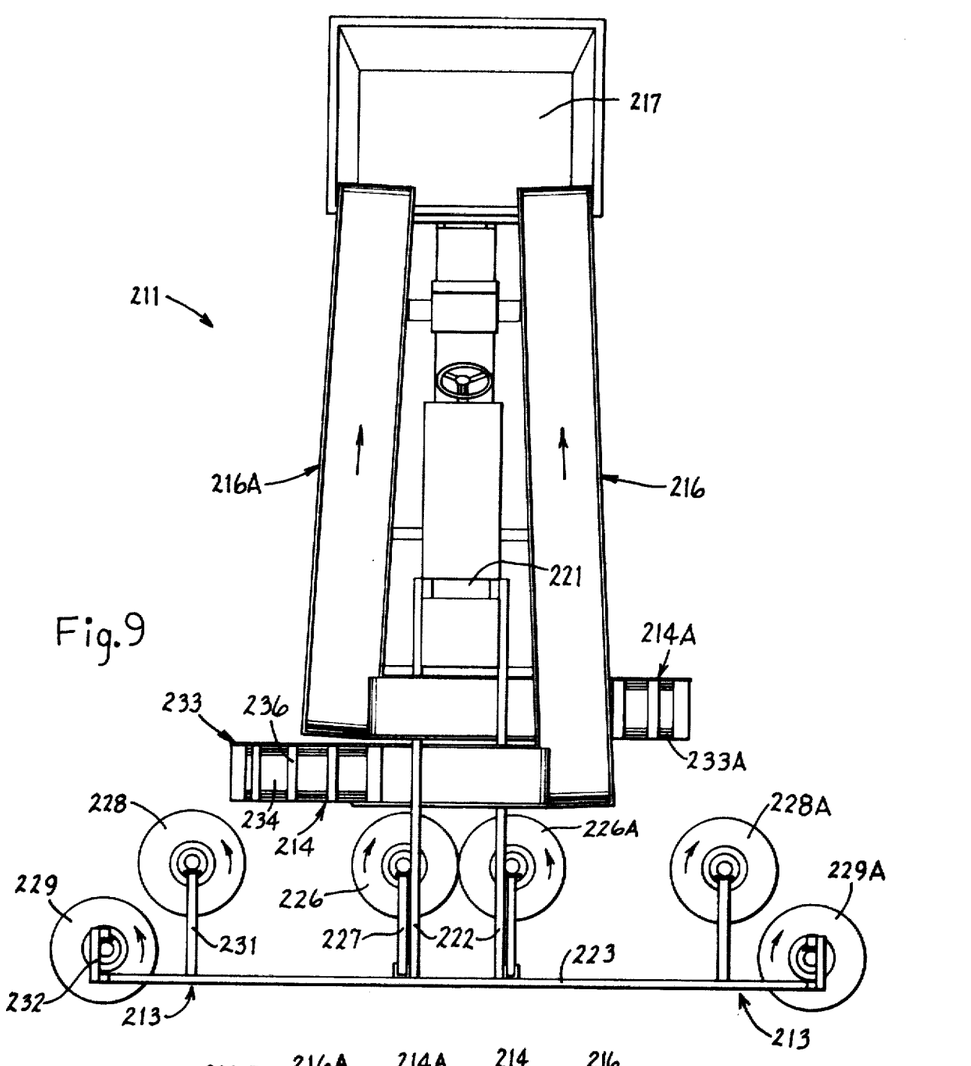
FIG. 9 is a top view of still a further apparatus having both means for gathering the fruit into windrows and additionally having means for picking up the fruit and depositing same into a container.
Figure 10:
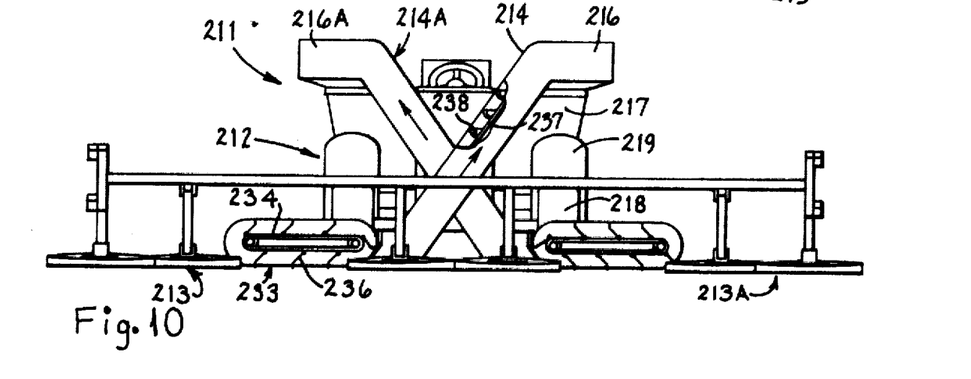
FIG. 10 is a front elevational view of the apparatus illustrated in FIG. 9.

FIGS. 9 and 10 illustrate therein a further variation of the present invention wherein there is provided an apparatus 211 which is capable of both gathering the fruit as deposited on the ground into windrows, and then picking up the fruit and depositing same into a container. This apparatus is highly desirable since it performs both a gathering and a pickup function.

This apparatus 211, as illustrated in FIGS. 9 and 10, includes a self-propelled vehicle 212 having a brush system 213 mounted on the front end of the vehicle and disposed for association with an area of the ground extending along at least one side of the vehicle. The brush system 213 collects or gathers the fruit on the ground, which fruit is then fed to a pickup system 214 which picks the fruit from the ground and deposits it onto a conveyor means 216, which in turn conveys the fruit to a collecting device or container 217. The apparatus 211 is also provided with a further brush system 213A mounted on front thereof and associated with the other side of the vehicle, which brush system 213A coacts with a further pickup system 214A, which in turn communicates with a further conveyer means 216A which also communicates with the container 217. The brush system 213A, the pickup system 214A, and the conveyer means 216A are substantially identical to the systems 213, 214 and 216, respectively, both in terms of structure and function, and thus only the systems 213, 214 and 216 will be discussed in detail.

Before considering the above-mentioned systems, it should be noted that the self-propelled vehicle 212 again includes conventional steerable front wheels 218 and drivable rear wheels 219 supporting the vehicle frame 221. The frame 221 has a pair of rigid mounting arms 22 projecting forwardly thereof, which arms in turn rigidly support a beam 223 which extends transversely across the front of the vehicle.

The brush system 213 is supported on the cross beam 223 and includes a center brush assembly 226 which is mounted on the rear free end of an elongated arm 227, which arm 227 at its forward end is pivotally connected to the cross beam 223 to enable vertical pivotal movement of the arm whereby the brush assembly 226 can thus bear on the ground.

The brush system 213 also includes a further pair of rotating brush assemblies 228 and 229 spaced outwardly from one side of the vehicle and spaced a substantial distance from the center brush assembly 226. The brush assembly 228 is supported on the rear free end of a further arm 231 which has its forward end hinged to the cross beam 223. The outermost brush assembly 229 is supported by a suitable parallelogram linkage 232 which is substantially identical to the parallelogram linkage used for supporting the front brush assembly 51 as illustrated in FIG. 2. This parallelogram linkage 232 permits vertical floating movement of the brush assembly 229. The brush assembly 229 is also spaced forwardly of and partially overlaps the brush assembly 228 relative to the direction of travel of the vehicle.

Brush assemblies 226, 228 and 229 are constructed substantially identical to the brush assembly shown in FIGS. 4 and 5, and thus further description of same is not believed necessary. However, the brush assemblies 228 and 229 both rotate in the same direction (counterclockwise in FIG. 9), whereas the brush assembly 226 rotates in the opposite direction (clockwise in FIG. 9) so as to cause the fruit on the ground to be collected within the space defined between the brush assemblies 226 and 228.

To pick up the fruit which is windrowed in the space between the brush assemblies 226 and 228, the pickup system 214 includes a bladed conveyor means 233 which includes an endless conveyor 234 having a plurality of blades or pushers 236 mounted thereon. The conveyor 233 extends substantially horizontally in a direction substantially transverse to the direction of movement of the vehicle. Further, the lower reach of the conveyor belt 234 moves inwardly toward the lower open end of a bucket-type conveyor 237, which conveyor 237 also comprises a portion of the conveyor system 214. The bladed conveyor 233 is open on the front side thereof but has a rear wall which closes same so that the fruit which is gathered in a row between the brushes 226 and 228 will enter into the spaces between the pushers or blades 236 as the vehicle is driven along. Due to the movement of the conveyor belt 234, the blades 236 push the fruit toward the inlet end of the bucket conveyor 237, which movement occurs rightwardly in FIG. 10.

With respect to the bucket conveyor 237, same is confined within a channellike housing and includes an endless conveyor belt having bucketlike elements 238 thereon. The lower end of the housing associated with conveyor 237 is open so that the pusher blades 236 may move the fruit into the open end of the conveyor 237, whereupon the fruit becomes deposited onto the upwardly moving bucketlike elements 238. The fruit is thus carried upwardly by the elements 238 and deposited onto the conveyor system 216, which conveyor may comprise a conventional belt-type conveyor. The conveyor 216 then moves the fruit rearwardly and deposits same into the container 217. The container 217 is removable from the vehicle when filled with fruit.

With respect to the brush system 213A, this system is identical to the system 213 except that the respective brush assemblies thereof rotate in the opposite direction with respect to the assembly 213. It should also be noted that the center brush assemblies 226 and 226A are disclosed closely adjacent one another to insure that all of the fruit is moved outwardly into a windrow so as to permit gathering and collecting thereof. The rotating brush assemblies 226A, 228A and 229A associated with the system 213A cause the fruit to be collected in a further windrow which is disposed ahead of a further bladed conveyor means 233A, which conveyor means 233A pushes the fruit onto a further bucket-type conveyor associated with the conveyor 214A. This then deposits the fruit onto the belt of the conveyor 216A, whereupon the fruit is then transferred to the container 217.

The apparatus 250 (FIGS. 11 and 12), which includes the self-propelled vehicle 251, has brush systems 252 and 253 which are supported by the vehicle 251. The system 252, for example, has a front beam 254 and a rear beam 255 which are pivoted and hinged near their inner ends, where they are attached to the vehicle 251 so that they can be swung forwardly (upwardly in FIG. 11) from their FIG. 11 positions and then pivoted into positions of alignment over the vehicle for transport along the road.

The front beam 254 supports a plurality, such as six brushes 257 each of which may be identical with the brush in the brush assembly 22 (FIG. 5). The inner four brushes 257A, 257B, 257C and 257D are supported in substantially the same manner as the brush in the brush assembly 51 (FIG. 2). That is, a parallelogram 258 of links is connected at one upper corner to the beam 254 and at the opposite lower corner to said four brushes so that they can float as they are driven by motor means, such as the fluid motor 58 (FIG. 5).

The brush 257E is part of an assembly similar to the assembly 22 (FIG. 5) except that the bracket 261 connecting the brush motor to the end of the beam 254 may be slightly taller than the bracket 59.

Figure 11:
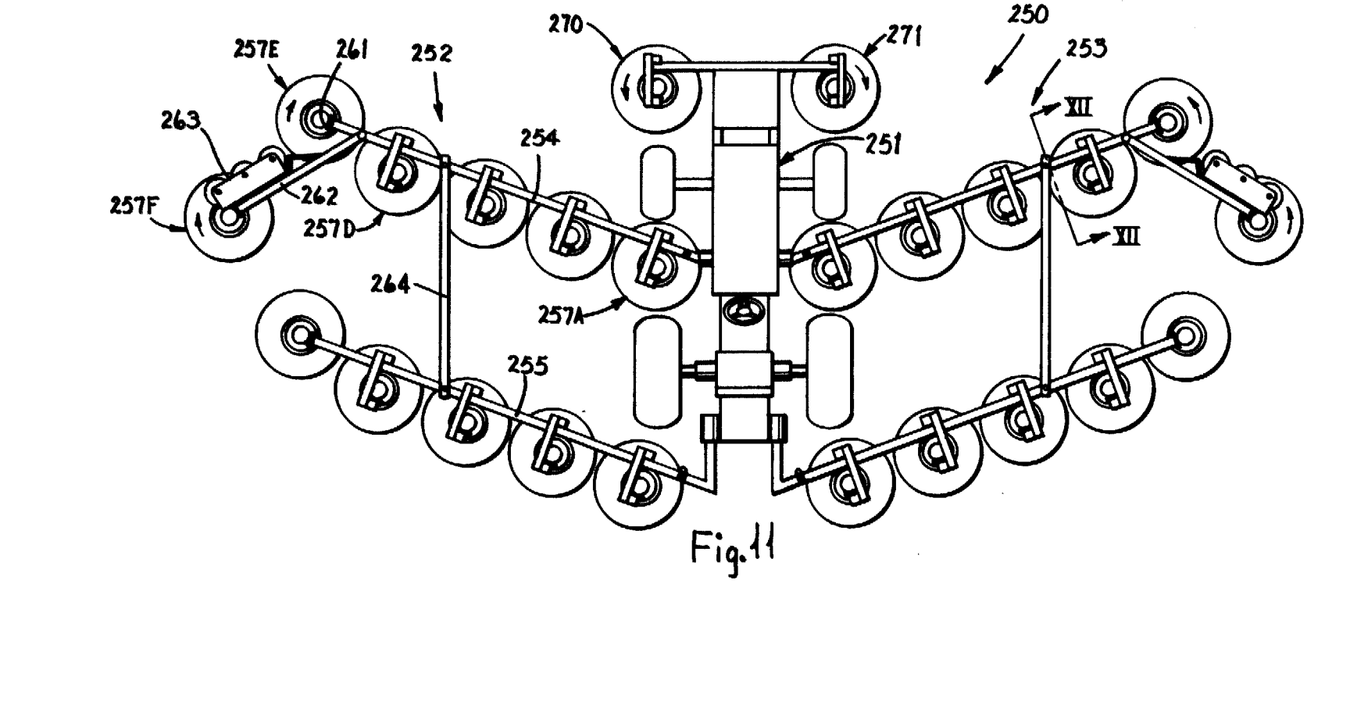
FIG. 11 is a top view of a modified apparatus embodying the invention.
Figure 12:
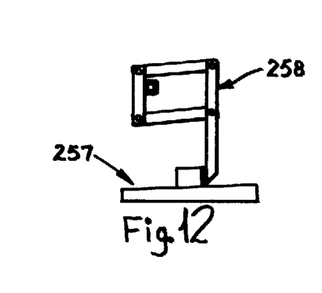
FIG. 12 is a sectional view taken along the line XII—XII in FIG. 11.

The brush assembly 257F, which may be similar to the assembly 257E, is mounted near the outer end of the arm 262, which is pivotally mounted on the beam 254 near its outer end and urged by spring means (not shown) into its extended position of FIG. 11. The bumper rollers 263 on the arm 262 perform the same function as the rollers 78 on arm 26 (FIG. 3).

The beam 254A in the system 253 and the brush assemblies attached thereto are preferably the same as the beam 254 and its brush assemblies, except that they are arranged as a mirror image.

The rear beam 255 supports five brush assemblies, the inner four of which are preferably identical with the inner four assemblies on the beam 254. The outer-most assembly on beam 255 is preferably identical with the assembly on beam 254 which includes the brush 257E. The beams 254 and 255 are releasably connected to a crossbar 264.

The rear beam 255A and the brush assemblies attached thereto are mirror images of the beam 255 and its brush assemblies.

In a modification of the apparatus 250 (FIGS. 13 and 14), the brush 257E is supported on beams 254 by a parallelogram 258. A ground engaging wheel 266 is mounted upon the lower end of a leg 267, the upper end of which is secured to the outer end of the beam 254. Thus, the outer end of the beam 254 is supported by the wheel 266 instead of by the brush 257E, as in FIG. 11.

Figure 13:
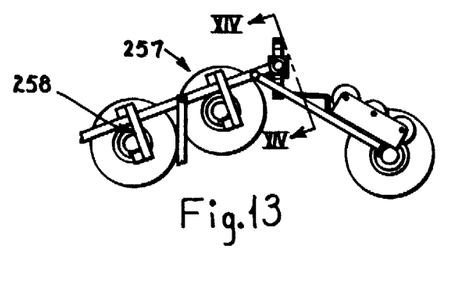
FIG. 13 is a fragment of FIG. 11 showing an alternate structure.
Figure 14:
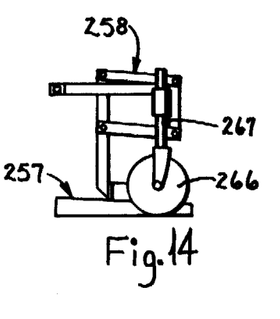
FIG. 14 is a sectional view taken along the line XIV—XIV in FIG. 13.

The beams 254A, 255 and 255A may also be supported by wheels 266, if desired.

The brush assemblies 270 and 271 may be identical with the brush assemblies 51 and for the same purpose.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are as follows:

1. An apparatus adapted for collecting fruit or the like lying on a supporting surface, such as the ground, comprising:
    a carrier adapted to be moved along the ground, said carrier having means disposed in engagement with the ground for supporting the carrier on the ground and for enabling the carrier to be moved relative to the ground;
    rotary brush means disposed adjacent the ground and supported thereon for rotation about an axis which is substantially upright, said brush means including a rotatable hub and a plurality of elongated bristles fixed to said hub and projecting radially outwardly therof, said bristles being constructed of a relatively stiff but flexible material, said bristles being disposed within a plurality of circumferentially extending layers which are spaced axially from one another along the rotational axis of said brush means;
    drive means drivingly connected to said brush means for rotating same about said axis;
    means connected between said carrier and said brush means for permitting said brush means to be freely moved relative to said carrier in a substantially vertical direction;
    support means connected to said brush means and positioned for engagement with the ground for supporting said brush means adjacent the ground, said support means being disposed within an imaginary cylinder defined by the periphery of said rotary brush means;
    said support means comprising a support foot having a lower surface disposed for slidable engagement with the ground, said support foot being fixed to said brush means and rotatable therewith about said axis, whereby said lower surface likewise rotates as it slidably moves along the ground; and
    deflector means mounted on said hub for causing at least the lowermost layer of bristles to be deflected slightly downwardly whereby the free ends of the bristles are disposed below said lower surface, said plurality of bristles extending generally parallel to the surface of the ground when the brush means is disposed in engagement therewith.

2. An apparatus according to claim 1, wherein the lower surface of said support foot is convex.

3. An apparatus adapted for collecting fruit or the like lying on a supporting surface, such as the ground, comprising:
    a carrier adapted to be moved along the ground, said carrier having means disposed in engagement with the ground for supporting the carrier on the ground and for enabling the carrier to be moved relative to the ground;
    rotary brush means disposed adjacent the ground and supported thereon for rotation about an axis which is substantially upright;
    means connected between said carrier and said brush means for permitting said brush means to be freely moved relative to said carrier in a substantially vertical direction;
    said connecting means including an elongated lever pivotally connected adjacent one end thereof to said carrier for permitting substantially vertical swinging movement of said lever, and said brush means being mounted on said lever substantially adjacent the other end thereof;
    said connecting means also including pivot means connected between said lever and said carrier for permitting substantially horizontal swinging movement of said lever relative to said carrier; and
    support means connected to the said brush means and positioned for engagement with the ground for supporting said brush means adjacent the ground, said support means being disposed within an imaginary cylinder defined by the periphery of said rotary brush means.

4. An apparatus, particularly adapted for gathering fruit or the like lying on the ground, comprising:
    carrier means adapted to be moved along a support surface, such as the ground, and having a plurality of support rollers disposed in rolling engagement with the ground;
    a plurality of brush assemblies positioned adjacent the surface of the ground, each brush assembly including an annular brush mounted for rotation about a substantially vertical axis; and
    mounting means connected between said plurality of brush assemblies and said carrier means for permitting said brush assemblies to freely vertically float relative to said carrier means, whereby said brush assemblies follow the contour of the ground;
    said mounting means including a plurality of elongated arms each being pivotally connected adjacent one end thereof to said carrier means for enabling substantially vertical swinging movement of said arms, each said arm having a brush assembly mounted adjacent the other end thereof;

at least one of said arms being of substantial length and extending primarily in a horizontal direction, and said mounting means including hinge means connected directly between said carrier means and said one arm adjacent said one end thereof for permitting substantially horizontal swinging movement of said arm relative to said carrier means;

said plurality of arms including a further arm hingedly connected adjacent one end thereof to the rear portion of said carrier means for permitting substantially vertical swinging movements of said further arm relative to said carrier means, said further arm projecting rearwardly of said carrier means relative to the direction of travel thereof and having one of said brush assemblies mounted thereon adjacent the other end thereof, said further arm being prevented from swinging in a horizontal direction.

5. An apparatus, particularly adapted for gathering fruit or the like lying on the ground, comprising:

carrier means adapted to be moved along a support surface, such as the ground, and having a plurality of support rollers disposed in rolling engagement with the ground;

a plurality of brush assemblies positioned adjacent the surface of the ground, each brush assembly including an annular brush mounted for rotation about a substantially vertical axis; and mounting means connected between said plurality of brush assemblies and said carrier means for permitting said brush assemblies to freely vertically float relative to said carrier means, whereby said brush assemblies follow the contour of the ground;

said mounting means including a plurality of elongated arms each being pivotally connected adjacent one end thereof to said carrier means for enabling substantially vertical swinging movement of said arms, each said arm having a brush assembly mounted adjacent the other end thereof;

at least one of said arms being of substantial length and extending primarily in a horizontal direction, and said mounting means including hinge means connected directly between said carrier means and said one arm adjacent said one end thereof for permitting substantially horizontal swinging movement of said arm relative to said carrier means;

said plurality of arms projecting sidewardly of said carrier means and being inclined towards the rear of said carrier means so that the brush assembly as mounted on said outer end of each arm is positioned rearwardly of said one end of each arm relative to the direction of travel of said carrier means, said plural brush assemblies being disposed substantially within a row which extends outwardly at an acute angle relative to the forward direction of travel of said carrier means, said row including at least three brush assemblies with the outermost brush assembly being spaced at least slightly forwardly of the center brush assembly relative to the direction of travel, and the center brush assembly being spaced slightly forwardly of the inner brush assembly relative to the direction of travel, and the path of movement of the center brush assembly in the direction of carrier travel laterally overlapping the paths of movement of the inner and outer brush assemblies.

6. An apparatus according to claim 5, further including drive means drivingly connected to said three brush assemblies for causing said three brush assemblies to all rotate in the same direction.

7. An apparatus according to claim 5, wherein at least one of said brush assemblies is positioned substantially in alignment with and ahead of one of the support rollers for engaging the ground ahead of said support roller, and said mounting means including link means pivotally connected to said carrier means and having said one brush assembly mounted thereon for enabling said brush assembly to vertically swing downwardly into engagement with the ground, the point of pivotal connection between said link means and said carrier means being spaced forwardly of said one brush assembly relative to the direction of travel.

8. An apparatus for picking up fruit or the like from the ground and for depositing same into a container, comprising:

carrier means adapted for support on and movement along the ground, said carrier means having a plurality of rollers disposed in rolling engagement with the ground;

conveyor means mounted on said carrier means for lifting the fruit upwardly from a first location positioned adjacent the ground to a second location spaced a substantial distance above the ground, said conveyor means further having means for causing the fruit to be discharged from said second location into said container;

pickup means mounted on the front portion of said carrier means for engaging the fruit on the ground and for transporting the fruit to said first location where the fruit is deposited on said conveyor means;

said pickup means including rotary brush means positioned forwardly of said first location relative to the direction of travel of said carrier means and disposed for engagement with the ground, said rotary brush means includes a plurality of brushes positioned adjacent the front portion of said carrier means and supported for rotation about substantially vertical axes;

said pickup means also including a movable pushing member disposed forwardly of the front portion of said carrier means and positioned for movement in a plane substantially transverse to the direction of movement of said carrier means, said movable pushing member having a portion thereof movable along the surface of the ground for engaging the fruit lying on the ground and for moving said fruit to said first location wherein the fruit is deposited on said conveyor means; and said plurality of rotary brushes including first and second rotary brushes positioned directly in front of said pushing member and laterally spaced from one another adjacent the opposite sides of said pushing member, said first and second rotary brushes being driven in opposite rotational directions for sweeping the fruit on the ground into the space between the first and second brushes whereby the fruit is engaged by the pushing member.

9. An apparatus adapted for collecting fruit or the like lying on a supporting surface, such as the ground, comprising:
- a carrier adapted to be moved along the ground, said carrier having means disposed in engagement with the ground for supporting the carrier on the ground and for enabling the carrier to be moved relative to the ground;
- rotary brush means, including a plurality of brushes, disposed adjacent the ground and supported thereon for rotation about an axis which is substantially upright;
- connecting means connecting between said carrier and said brush means for permitting said brush means to be freely moved relative to said carrier in a substantially vertical direction, said connecting means including plural beams secured at one end of each to said carrier, and at least some of said brushes being mounted for movement vertically relative to said beams; and
- support means connected to at least some of said brushes and positioned for engagement with the ground for supporting said brushes adjacent the ground, said support means being disposed within an imaginary cylinder defined by the periphery of said rotary brushes.

10. An apparatus adapted for collecting fruit or the like lying on a supporting surface, such as the ground, comprising:
- a carrier adapted to be moved along the ground, said carrier having means disposed in engagement with the ground for supporting the carrier on the ground and for enabling the carrier to be moved relative to the ground;
- a rotary brush assembly positioned adjacent the surface of the ground, said brush assembly including an annular brush mounted for rotation about a substantially vertically axis;
- mounting means connected between said brush assembly and said carrier for permitting said brush assembly to vertically float relative to said carrier;
- support means coacting with said mounting means and positioned with engagement with the ground for supporting said brush assembly adjacent the ground while enabling said annular brush to follow the contour of the ground; and
- said annular brush having a high bristle density and including a rotatable hub and a plurality of elongated bristles fixed to said hub and projecting outwardly therefrom primarily in a radial direction, said bristles being constructed of a relatively stiff but flexible material, said plurality of bristles being disposed within a plurality of circumferential layers surrounding said hub with said bristles extending generally in a direction which is substantially parallel with the surface of the ground when said annular brush is disposed in engagement therewith.

11. An apparatus according to claim 10, wherein said brush assembly includes drive means connected to said annular brush for rotating same at a speed whereby the tips of said bristles move at a peripheral velocity of between approximately 16 and 32 feet per second.

12. An apparatus according to claim 10, further including an annular deflector mounted on said hub and coacting with the lowermost circumferential layer of bristles for deflecting said bristles slightly axially downwardly toward the ground, whereby the lowermost layer of bristles project radially outwardly but downwardly at a small angle relative to a radial plane which is perpendicular to the rotational axis of said brush, another of said circumferential layers of bristles having the bristles thereof disposed in a plane which is substantially perpendicular to said rotational axis.

13. An apparatus according to claim 12, wherein said brush assembly includes fluid pressure motor means directly associated therewith and directly drivingly connected to said hub for rotating same.

14. An apparatus, particularly adapted for gathering fruit or the like lying on the ground, comprising:
- carrier means adapted to be moved along a support surface, such as the ground, and having a plurality of support rollers disposed in rolling engagement with the ground;
- a brush assembly positioned adjacent the surface of the ground, said brush assembly including an annular brush mounted for rotation about a substantially vertical axis;
- elongated arm means pivotally interconnected adjacent one end thereof to said carrier means for enabling substantially horizontal swinging movement of said arm means, said arm means being elongated substantially horizontally and extending sidewardly relative to said carrier means, and said brush assembly being mounted on said arm means adjacent the other end thereof;
- means associated with said arm means for limiting the forward swinging movement thereof relative to said carrier means in the direction of travel thereof to a frontmost position;
- means coacting with said arm means for urging said arm means into said frontmost position while permitting said arm means to horizontally swing rearwardly away from said frontmost position; and
- means mounting said brush assembly for vertical movement relative to said carrier means to enable said brush assembly to follow the contour of the surface of the ground.

15. An apparatus according to claim 14, wherein said means for urging said arm means into said frontmost position includes drive motor means drivingly connected to said brush assembly for causing rotation of said brush in a selected direction whereby the rotational engagement of said brush with the ground causes the brush to walk along the surface of the ground in the forward direction of the carrier means to swing the arm means into said frontmost position.

16. An apparatus according to claim 14, further including bumper means mounted on said arm means and positioned for engagement with a trunk of a tree to enable said arm means and the brush assembly mounted thereon to be safely moved around said trunk, whereby engagement of said bumper means with said trunk assembly causes said arm means to be swung rearwardly away from said frontmost position, said urging means causing said arm means to automatically return to said frontmost position after said arm means moves out of engagement with said trunk.

17. An apparatus according to claim 14, wherein said mounting means includes hinge means interconnected between said carrier means and said one end of said arm means for permitting said arm means to swingably move both vertically and horizontally relative to said carrier means.

18. An apparatus according to claim 14, wherein said urging means includes spring means.

19. An apparatus according to claim 14, wherein there are a plurality of said brush assemblies rotatably mounted on said arm means, and said mounting means for at least one of said brush assemblies including a parallelogram linkage which is hingedly connected for swinging movement within a substantially vertical plane and has said one brush assembly mounted on the lower end thereof.

20. An apparatus, particularly adapted for gathering fruit and the like lying on the ground and for collecting same into a windrow, comprising:

- carrier means adapted to be moved along a support surface, such as the ground, and having a plurality of support rollers disposed in rolling engagement with the ground;
- first elongated arm means extending substantially horizontally and projecting outwardly to one side of said carrier means, and a first plurality of brush assemblies rotatably mounted on said first arm means and positioned sidewardly of said carrier means;
- second elongated arm means extending substantially horizontally and projecting outwardly from the other side of said carrier means, and a second plurality of brush assemblies rotatably mounted on said second arm means and spaced sidewardly of said carrier means;
- a third plurality of brush assemblies positioned directly in front of each of the frontmost support rollers of said carrier means;
- each of said brush assemblies being rotatable about a substantially vertical axis and including a plurality of bristles surrounding said axis in a circumferential layer and projecting outwardly from said axis primarily in a radial direction;
- means supporting each of said brush assemblies for permitting said brush assemblies to individually vertically float relative to the ground so that the individual brush assemblies remain in engagement with the surface of the ground while following the contour thereof; and
- drive means connected to said brush assemblies for rotating same whereby the bristles create a sweeping action as they travel along the surface of the ground.

* * * * *